United States Patent
Miki et al.

(10) Patent No.: US 11,199,166 B2
(45) Date of Patent: Dec. 14, 2021

(54) SADDLE RIDING VEHICLE

(71) Applicant: HONDA MOTOR CO., LTD., Tokyo (JP)

(72) Inventors: Sosuke Miki, Asaka (JP); Yukinori Kurakawa, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 16/665,195

(22) Filed: Oct. 28, 2019

(65) Prior Publication Data

US 2020/0158060 A1 May 21, 2020

(30) Foreign Application Priority Data

Nov. 16, 2018 (JP) .............................. JP2018-215999

(51) Int. Cl.
| F02M 35/10 | (2006.01) |
| F02M 35/02 | (2006.01) |
| F02M 35/16 | (2006.01) |
| F02M 35/024 | (2006.01) |
| F01P 1/06 | (2006.01) |
| B62J 45/00 | (2020.01) |
| B62J 50/16 | (2020.01) |

(52) U.S. Cl.
CPC ............. *F02M 35/162* (2013.01); *F01P 1/06* (2013.01); *F02M 35/024* (2013.01); *B62J 45/00* (2020.02); *B62J 50/16* (2020.02); *F01P 2050/16* (2013.01)

(58) Field of Classification Search
CPC .. F02M 35/162; F02M 35/048; F02M 35/021; F02M 35/04; F02M 35/10013; F02M 35/10144; F02M 35/02; F02M 35/10032; F02M 35/10249; F02M 35/10288
See application file for complete search history.

(56) References Cited

U.S. PATENT DOCUMENTS

| 2004/0050357 A1 | 3/2004 | Idei et al. | |
| 2007/0057489 A1* | 3/2007 | Horiuchi | .................. B62J 27/00 |
| | | | 280/730.1 |

(Continued)

FOREIGN PATENT DOCUMENTS

| JP | 2005-069232 | 3/2005 |
| JP | 2005-090268 | 4/2005 |
| JP | 2018-031264 | 3/2018 |

OTHER PUBLICATIONS

Indian Office Action dated Oct. 23, 2020, English translation included, 6 pages.

*Primary Examiner* — Long T Tran
(74) *Attorney, Agent, or Firm* — Rankin, Hill & Clark LLP

(57) ABSTRACT

An ECU is covered by a fuel tank and an upper cover which are vehicle body trim parts along with the upper surface of an air cleaner box. A frame holding duct is connected to the air cleaner box, the frame holding duct extends vehicle forward from the air cleaner box, is connected to a body frame, and is arranged inside an upper cowl, the upper cowl covering the front portion of the body frame, a branching portion of the intake air is arranged in the frame holding duct, and a branching passage extending from the branching portion is disposed between the upper surface of the air cleaner box and the fuel tank and the upper cover and is positioned in front of the ECU.

6 Claims, 9 Drawing Sheets

(56) References Cited

U.S. PATENT DOCUMENTS

| | | | | |
|---|---|---|---|---|
| 2007/0144802 A1* | 6/2007 | Tsuya | ............... | F02M 35/162 |
| | | | | 180/68.2 |
| 2010/0162997 A1* | 7/2010 | Fukuuchi | ............ | F02D 11/10 |
| | | | | 123/399 |
| 2011/0155495 A1* | 6/2011 | Matsuda | ............ | B62K 19/30 |
| | | | | 180/219 |
| 2014/0225398 A1* | 8/2014 | Mikura | ............... | B62J 29/00 |
| | | | | 296/192 |
| 2015/0041232 A1* | 2/2015 | Takatsuka | .......... | B62K 19/38 |
| | | | | 180/219 |
| 2015/0192097 A1* | 7/2015 | Nishimura | ......... | F02M 35/042 |
| | | | | 123/468 |
| 2018/0093734 A1* | 4/2018 | Matsuo | ............. | B62K 11/04 |
| 2018/0127044 A1* | 5/2018 | Nakahira | ............ | B62J 23/00 |
| 2019/0305276 A1* | 10/2019 | Suzuki | ............ | B60R 16/0215 |

* cited by examiner

SADDLE RIDING VEHICLE

INCORPORATION BY REFERENCE

The present application claims priority under 35 U.S.C. § 119 to Japanese Patent Application No. 2018-215999 filed on Nov. 16, 2018. The content of the application is incorporated herein by reference in its entirety.

TECHNICAL FIELD

The present invention relates to a saddle riding vehicle.

BACKGROUND ART

Conventionally, as a saddle riding vehicle, there is known one in which an electric component (ECU: engine control unit) is disposed above an air cleaner, and a body forming component (fuel tank) is disposed above the electric component (refer to Patent Literature 1 for example).

The electric component is disposed in an enclosed position between the air cleaner and the body forming component.

CITATION LIST

Patent Literature

[Patent Literature 1] JP-A. No. 2018-31264

SUMMARY OF INVENTION

Technical Problem

According to Patent Literature 1, although it is probable to arrange an opening and a guide guiding the travelling air in a case that covers the electric component in order to cool the electric component, in an enclosed space between the air cleaner and the body forming component, it is hard to secure an air passage that effectively takes in the travelling air, and the function of the opening and the guide cannot be exerted sufficiently.

An object of the present invention is to provide a saddle riding vehicle in which an air passage effectively taking in the travelling air to an enclosed space is easily secured, and an electric component can be cooled intensively and positively.

Solution to Problem

In a saddle riding vehicle, in which an air cleaner box (35) is disposed above an engine (11) at a front portion of a vehicle body, an electric component (64) is disposed on and is supported by the upper surface of the air cleaner box (35), and the electric component (64) is covered by vehicle body trim parts (37, 44) along with the upper surface of the air cleaner box (35), an intake duct (85) is connected to the air cleaner box (35), the intake duct (85) extends vehicle forward from the air cleaner box (35), is connected to a body frame (10), and is arranged inside an upper cowl (41) covering the front portion of the body frame (10), a branching portion (82b) of intake air is arranged in the intake duct (85), and a branching passage (69) extending from the branching portion (82b) is disposed between the upper surface of the air cleaner box (35) and the vehicle body trim parts (37, 44) and is positioned in front of the electric component (64).

In the configuration described above, it is also possible that the intake duct (85) includes a first intake duct (51) and a second intake duct (82), the first intake duct (51) being connected to the front end portion of the body frame (10), the second intake duct (82) connecting the body frame (10) and the air cleaner box (35) to each other, and the branching portion (82b) is arranged in the second intake duct (82).

Also, in the configuration described above, it is also possible that the branching portion (82b) is formed at an upper portion of the second intake duct (82), an opening portion (82g) is formed in the inner surface of the second intake duct (82), the branching portion (82b) being provided with the opening portion (82g), and the opening portion (82g) is directed vehicle forward.

Also, in the configuration described above, it is also possible that the branching passage (69) includes a vehicle width direction extension portion (69d) directed to the vehicle width direction along a front portion of the electric component (64), and includes a plurality of air exhaust holes (69g) in the vehicle width direction extension portion (69d).

Also, in the configuration described above, it is also possible that an engage portion (69e) engaging with the electric component (64) is provided at an end portion of the branching passage (69).

Also, in the configuration described above, it is also possible that the branching passage (69) includes a discharge port connection portion (69a) fitted into a discharge port (82f) that is formed in the branching portion (82b) so as to extend in the vehicle width direction, and the engage portion (69e) clamps and supports a front-rear protrusion portion (77a) in the vehicle width direction, the front-rear protrusion portion (77a) being arranged in the electric component (64) so as to protrude in the vehicle longitudinal direction.

Also, in the configuration described above, it is also possible that the branching passage (69) extends obliquely upward to a side from the branching portion (82b) arranged at the center portion in the vehicle width direction, further extends vehicle rearward on the inner side in the vehicle width direction of a side edge (35a) of the air cleaner box (35) along the side edge (35a) in a plan view, and further curvingly extends inward in the vehicle width direction and reaches the front of the electric component (64).

Advantageous Effects of Invention

With respect to the saddle riding vehicle, the intake duct is connected to the air cleaner box, the intake duct extends vehicle forward from the air cleaner box, is connected to a body frame, and is arranged inside the upper cowl, the upper cowl covering the front portion of the body frame, the branching portion of the intake air is arranged in the intake duct, and the branching passage extending from the branching portion is disposed between the upper surface of the air cleaner box and the vehicle body trim parts and is positioned in front of the electric component. Accordingly, by arranging the branching portion in the intake duct and extending the branching passage from the branching portion to the electric component side, it is facilitated to secure an air passage in the enclosed space between the air cleaner box and the vehicle body trim parts, the air passage being for effectively taking in the intake air, and the electric component can be cooled intensively and positively utilizing the intake air.

In the configuration described above, the intake duct includes the first intake duct and the second intake duct, the first intake duct being connected to the front end portion of the body frame, the second intake duct connecting the body frame and the air cleaner box to each other, and the branching portion is arranged in the second intake duct. Accordingly, it is constructed that the travelling air is sucked through the body frame by the first intake duct connected to the front end portion of the body frame and is positively taken in, the branching passage is arranged in the second intake duct that is connected to the air cleaner box, thereby the intake air can be branched from a position close to the electric component, and the intake air can be guided effectively to the electric component.

Also, in the configuration described above, the branching portion is formed at the upper portion of the second intake duct, the opening portion is formed in the inner surface of the second intake duct, the branching portion being provided with the opening portion, and the opening portion is directed vehicle forward. Accordingly, the intake air flowing toward the air cleaner box inside the intake duct can be positively branched.

Also, in the configuration described above, the branching passage includes the vehicle width direction extension portion directed to the vehicle width direction along the front portion of the electric component, and includes a plural number of the air exhaust holes in the vehicle width direction extension portion. Accordingly, the electric component can be cooled efficiently with a simple shape.

Also, in the configuration described above, the engage portion engaging with the electric component is provided at the end portion of the branching passage. Accordingly, the branching passage can be supported by the electric component, and the supporting rigidity in supporting the branching passage can be enhanced with a simple structure.

Also, in the configuration described above, the branching passage includes the discharge port connection portion, the discharge port connection portion being fitted into the discharge port that is formed in the branching portion so as to extend in the vehicle width direction, and the engage portion clamps and supports the front-rear protrusion portion in the vehicle width direction, the front-rear protrusion portion being arranged in the electric component so as to protrude in the vehicle longitudinal direction. Accordingly, movement of the branching passage in the vehicle longitudinal direction and the vehicle width direction can be restricted.

Also, in the configuration described above, the branching passage extends obliquely upward to a side from the branching portion, the branching portion being arranged at the center portion in the vehicle width direction, further extends vehicle rearward on the inner side in the vehicle width direction of the side edge of the air cleaner box along the side edge in a plan view, and further curvingly extends inward in the vehicle width direction and reaches the front of the electric component. Accordingly, the bending angle of each portion of the branching passage can be made smaller, and the branching passage can be made to follow the shape of the air cleaner box and can be connected to the electric component from a position close to an end of the air cleaner box. Thus, the protrusion amount of the branching passage from the air cleaner box is suppressed, and the maintainability of replacement of a filter inside the air cleaner box and so on can be improved.

BRIEF DESCRIPTION OF DRAWINGS

FIG. 2 is a left side view that shows a body frame, an air cleaner box, an intake duct, and the like.

DESCRIPTION OF EMBODIMENTS

Figure 1:
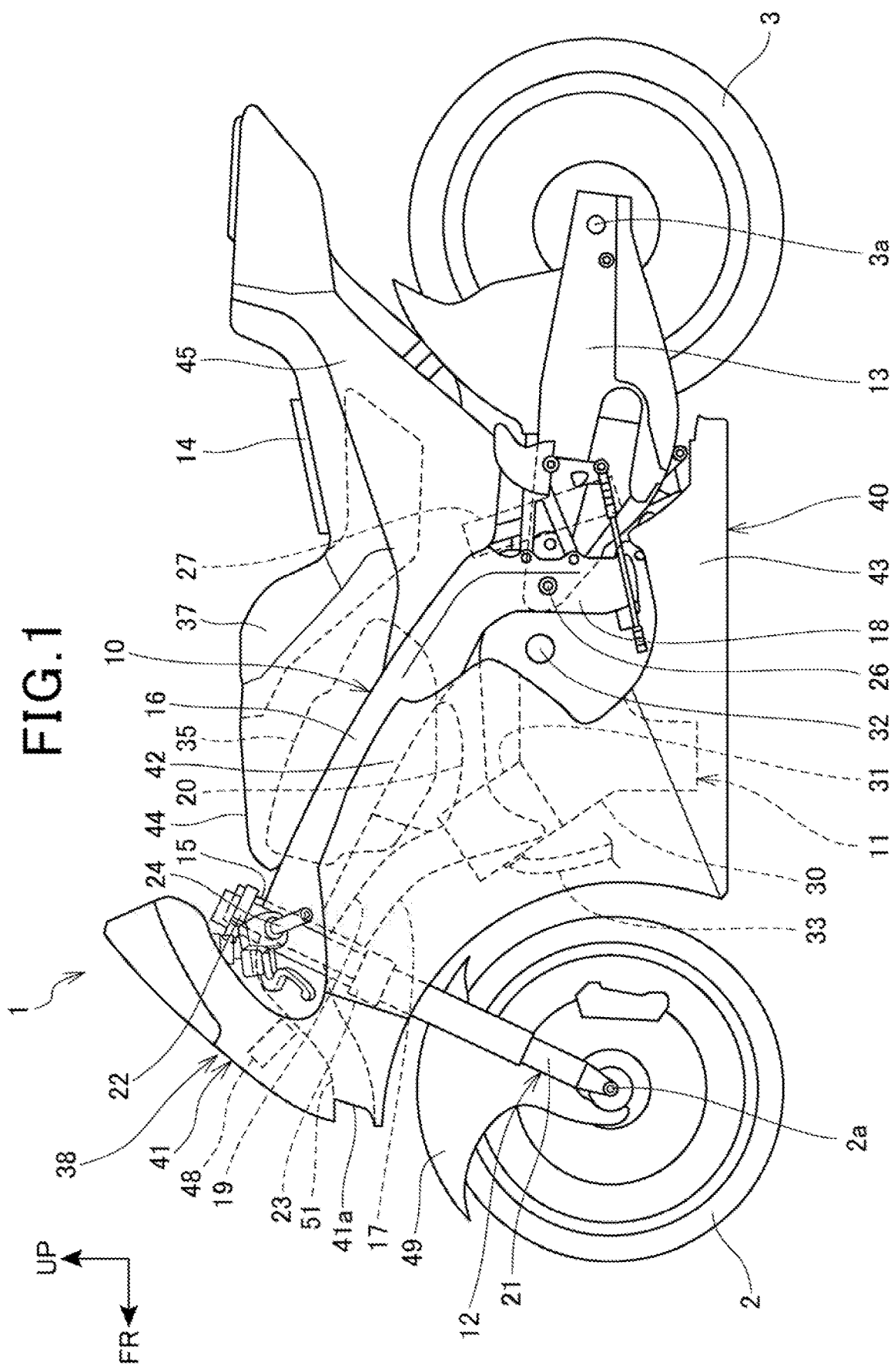
FIG. 1 is a left side view that shows a motorcycle according to an embodiment of the present invention.

Below, an embodiment of the present invention will be explained referring to the drawings. Also, in the explanation, description of the direction such as the front, rear, left, right, top, and bottom is the same as the direction with respect to the vehicle body unless stated otherwise in particular. Further, the reference sign FR shown in each drawing expresses vehicle forward, the reference sign UP expresses vehicle upward, and the reference sign LH expresses vehicle left hand.

FIG. 1 is a left side view that shows a motorcycle 1 according to an embodiment of the present invention.

The motorcycle 1 is a vehicle in which an engine 11 is supported by a body frame 10, front forks 12 steerably supporting a front wheel 2 are steerably supported by the front end portion of the body frame 10, and a swing arm 13 supporting a rear wheel 3 is arranged at the rear portion of the body frame 10. The motorcycle 1 is a saddle riding vehicle in which an occupant straddlingly sits on a seat 14, and the seat 14 is arranged above the rear portion of the body frame 10.

The body frame 10 includes a head pipe 15 positioned at the center in the vehicle width direction, a pair of left and right main frames 16, a pair of left and right down frames 17, a pair of left and right pivot frames 18, a pair of left and right seat frames (not illustrated), and a pair of left and right gussets 19.

The head pipe 15 is arranged at the front end of the body frame 10, and supports the front forks 12. The main frame 16 extends downward to the rear from the upper portion of the head pipe 15. The down frame 17 extends downward to the rear from the lower portion of the head pipe 15.

The pivot frame 18 extends downward from the rear end portion of the main frame 16. The seat frame extends rearward from the rear end portion of the main frame 16, and supports the seat 14. The gusset 19 vertically connects the front end portion of the main frame 16 and the front end portion of the down frame 17 to each other. The lower end portion of the down frame 17 and the rear portion of the main frame 16 are connected to each other by a connection portion 20 that extends in the vehicle longitudinal direction.

The front forks 12 include a steering shaft (not illustrated), a pair of left and right fork pipes 21, a top bridge 22, a bottom bridge 23, and a steering handlebar 24.

The steering shaft is turnably supported by the head pipe 15. The left and right fork pipes 21 are telescopic type shock absorbers. The top bridge 22 is fixed to the upper end of the steering shaft, and connects the upper portions of the left and right fork pipes 21 to each other. The bottom bridge 23 is fixed to the lower end of the steering shaft, and connects the left and right fork pipes 21 to each other. The steering handlebar 24 is fixed to the upper portion of the fork pipes 21.

The front wheel 2 is supported by a front wheel axle 2a that is stretched between the lower end portions of the left and right fork pipes 21.

The swing arm 13 is supported by a pivot shaft 26 at the front end portion, the pivot shaft 26 being stretched between the left and right pivot frames 18, and is vertically swingable around the pivot shaft 26.

The rear wheel 3 that is a driving wheel is supported by a rear wheel axle 3a that is arranged at the rear end portion of the swing arm 13.

The swing arm 13 is suspended from the vehicle body through a cushion unit 27.

The engine 11 is disposed below the main frame 16 and between the down frames 17 and the pivot frames 18, and is supported by the body frame 10.

The engine 11 includes a crankcase 30 and a cylinder portion 31, the crankcase 30 storing a crankshaft (not illustrated) that extends in the vehicle width direction (the left-right direction), the cylinder portion 31 extending upward from the upper portion of the front portion of the crankcase 30.

At the rear portion of the crankcase 30, a transmission (not illustrated) is incorporated, the transmission decelerating and outputting rotation of the engine 11. The output of the engine 11 is transmitted to the rear wheel 3 through a driving chain (not illustrated) that is stretched between an output shaft 32 of the transmission and the rear wheel 3.

An exhaust pipe 33 of the engine 11 is drawn out downward from an exhaust port located at the front surface of the cylinder portion 31, passes below the crankcase 30, and extends rearward.

An air cleaner box 35 of the intake system of the engine 11 is disposed above the engine 11 and between the left and right main frames 16. In a vehicle side view, the main frames 16 overlap with the air cleaner box 35 from the outer side. In the vehicle longitudinal direction, the air cleaner box 35 is disposed between the head pipe 15 and a fuel tank 37.

The intake air purified by the air cleaner box 35 passes through an intake passage (not illustrated), and flows to an intake port of the cylinder portion 31.

The fuel tank 37 is disposed above the rear portion of the main frames 16, and is disposed between the seat 14 and the air cleaner box 35 in the vehicle longitudinal direction.

The motorcycle 1 includes a body cover 38 that covers the vehicle body.

The body cover 38 includes a cowl 40, an upper cover 44, and a rear cover 45, the cowl 40 covering the front portion and the lower portion of the vehicle body, the upper cover 44 covering the air cleaner box 35 from above, the rear cover 45 covering the rear portion of the vehicle body.

The cowl 40 includes an upper cowl 41, a pair of left and right middle cowls 42, and a lower cowl 43, the upper cowl 41 covering the upper portion of the front forks 12 and the head pipe 15 from the front, the middle cowls 42 covering the front portion of the body frame 10 and the engine 11 from the left and right sides, the lower cowl 43 covering the engine 11 and the body frame 10 from below.

In the front surface of the upper cowl 41, an opening 41a taking in the travelling air is formed, and the front end portion of an intake duct 51 is connected to the edge portion of the opening 41a, the intake duct 51 guiding the travelling air to the air cleaner box 35 side.

Between the upper cowl 41 and the head pipe 15, a meter 48 is disposed, the meter 48 displaying information such as the vehicle speed.

A front fender 49 is supported by the left and right fork pipes 21.

Figure 2:
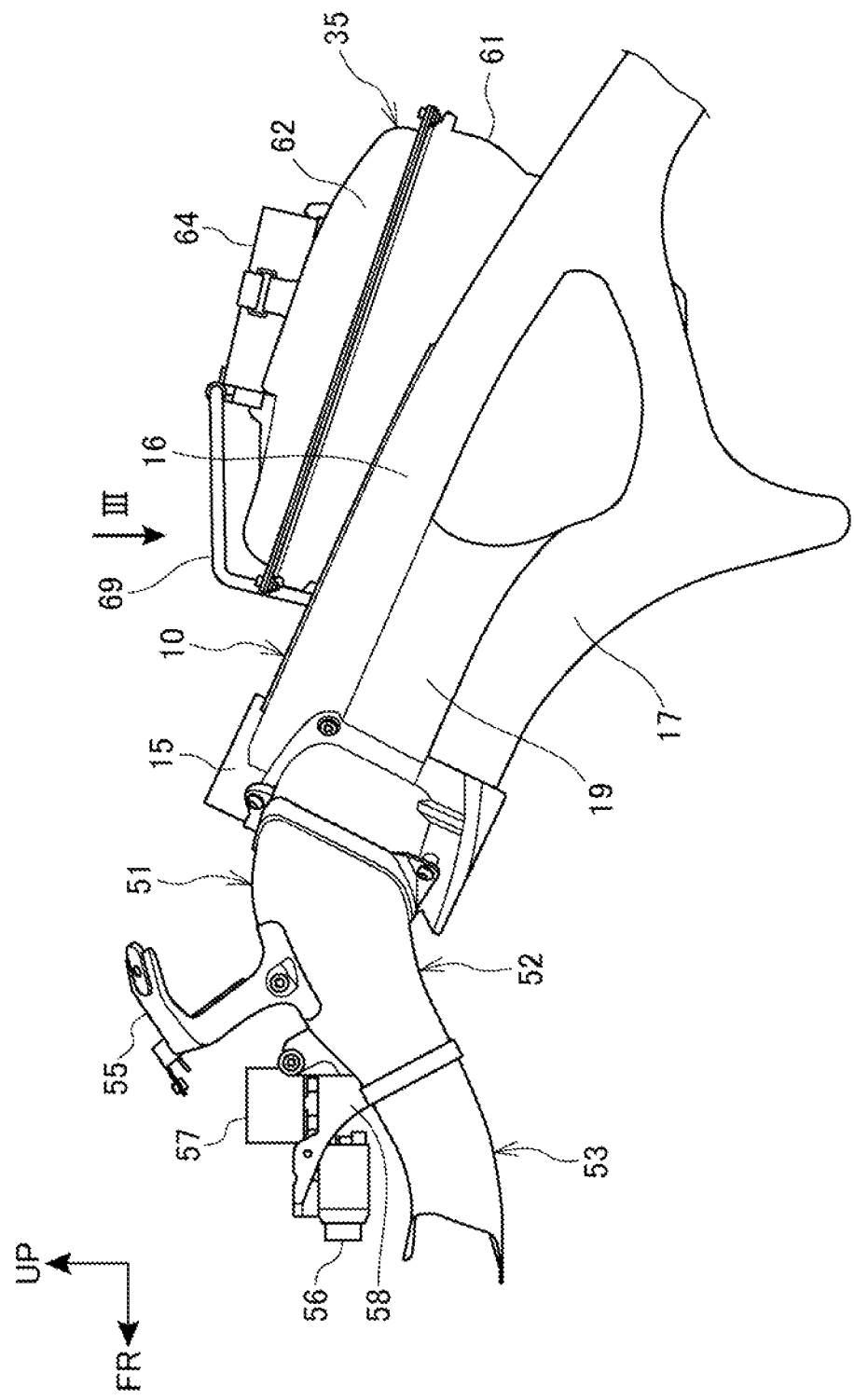

FIG. 2 is a left side view that shows the body frame 10, the air cleaner box 35, the intake duct 51, and the like.

In front of the head pipe 15 of the body frame 10, the intake duct 51 is disposed.

The intake duct 51 is a component having a two-split structure configured of a rear duct 52 and a front duct 53, the rear duct 52 being arranged on the head pipe 15 side, the rear end portion of the front duct 53 being connected to the front end portion of the rear duct 52.

By the rear duct 52, a rear stay 55 and a front stay 58 are supported, the rear stay 55 supporting the upper cowl 41 (refer to FIG. 1), the meter 48 (refer to FIG. 1) being attached to the rear stay 55, the front stay 58 supporting a camera 56 and a junction box 57, the camera 56 photographing the front of the vehicle, the junction box 57 storing connection portions of wiring of the electric component. The camera 56 may have a function of recording a photographed image, or may be attached with a recorder having a recording function.

The air cleaner box 35 includes a box body 61 and a box cover 62, and is disposed between the left and right main frames 16, the box body 61 having a box shape with the upper portion being opened, the box cover 62 closing the upper opening of the box body 61.

To the upper portion of the box cover 62, an ECU (Electronic Control Unit) 64 is attached. Here, an engine control unit controlling the engine 11 (refer to FIG. 1) is also included in the ECU 64.

The ECU 64 is covered by the fuel tank 37 (refer to FIG. 1) and the upper cover 44 (refer to FIG. 1) from above.

Figure 3:
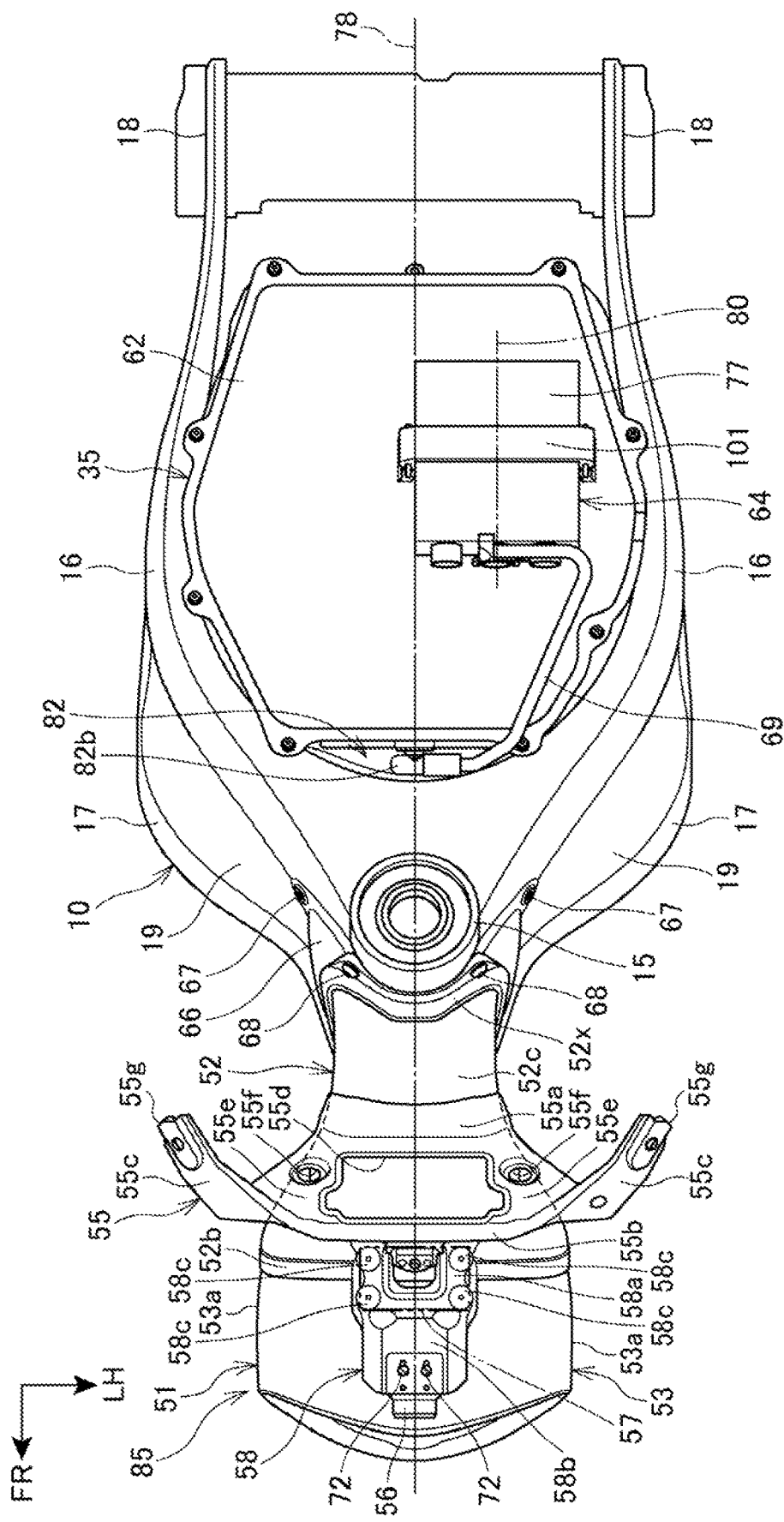
FIG. 3 is a drawing (plan view) as viewed along the arrow III of FIG. 2.

FIG. 3 is a drawing (plan view) as viewed along the arrow III of FIG. 2.

A duct support member 66 is attached by a plural number of bolts 67 to the body frame 10, or to be more specific, to the head pipe 15, the left and right main frames 16, the left and right down frames 17, and the left and right gussets 19. The duct support member 66 configures a part of the body frame 10.

A body frame connection portion 52x is arranged at the rear end portion of the rear duct 52 of the intake duct 51, and the body frame connection portion 52x is connected and is attached by a plural number of bolts 68 to the duct support member 66.

With respect to the rear duct 52, the front end portion is wider than the rear end portion in the vehicle width direction, and the front end portion of the rear duct 52 has a flattened shape in which the width in the vehicle width direction is larger than the width in the vertical direction.

With respect to the front duct 53, left and right ends 53a, 53a extend respectively in the vehicle longitudinal direction. The front duct 53 also has a flattened shape in which the width in the vehicle width direction is larger than the width in the vertical direction.

At the front end portion of the rear duct 52, an expanded portion 52b is formed, the inner dimension of the inner surface being increased for a portion behind the front end portion in the expanded portion 52b, and the rear end portion of the front duct 53 is inserted and connected to the expanded portion 52b of the rear duct 52.

The rear stay 55 is arranged on an upper surface 52c of the intermediate portion of the length in the vehicle longitudinal direction in the rear duct 52, and includes a fixing portion 55a, a center portion 55b, and a pair of left and right inclined extension portions 55c in an integral manner.

The fixing portion 55a is formed along the upper surface 52c of the rear duct 52, and is fixed to the upper surface 52c of the rear duct 52 by a pair of left and right screws.

The center portion 55b is a portion having a contour of a generally rectangular shape that stands up from the fixing portion 55a, and includes a meter opening portion 55d and a pair of left and right meter support portions 55e, the meter 48 (refer to FIG. 1) being fitted into the meter opening portion 55d, the meter support portions 55e being arranged at both side edge portions of the meter opening portion 55d and supporting the meter 48 (refer to FIG. 1). In the meter support portions 55e, a meter support hole 55f is opened, the meter support hole 55f being for elastically supporting the meter 48 by a bolt and an elastic member.

The left and right inclined extension portions 55c respectively extend obliquely upward to a side from the both side edges of the center portion 55b in a vehicle front view, and cowl support portions 55g are provided at the distal end portions of the left and right inclined extension portions 55c, the cowl support portions 55g respectively supporting the upper cowl 41 (refer to FIG. 1).

As described above, the rear stay 55 doubles as a cowl stay that supports the upper cowl 41 (refer to FIG. 1) and a meter stay that supports the meter 48.

The front stay 58 is positioned obliquely downward to the front from the rear stay 55, is adhered to or fixed by screws to the upper surface 52c of the front portion of the rear duct 52, and includes a box support portion 58a and a camera support portion 58b.

The box support portion 58a is a portion supporting the junction box 57, is formed into a rectangular shape in a plan view, and includes attaching portions 58c for the junction box 57 at respective corner portions of the rectangular shape.

The camera support portion 58b is a portion that extends forward from the front end portion of the box support portion 58a and supports the camera 56, and the upper surface of the camera support portion 58b is arranged at a position higher than the attaching portions 58c of the box support portion 58a. To the lower portion of the camera support portion 58b, the camera 56 is attached by a pair of left and right screws 72.

The ECU 64 includes an ECU case 77 having a box shape, and an ECU center line 80 passing the center in the vehicle width direction of the ECU 64 (to be more specific, the ECU case 77) is offset to one side (the left side) in the vehicle width direction with respect to a vehicle body center line 78 that passes the center of the vehicle width and extends in the vehicle longitudinal direction.

To an intake duct (to be more specific, a joint 82 which will be described in detail below) that is located behind the head pipe 15 and between the body frame 10 and the air cleaner box 35, a branching passage 69 is connected, the branching passage 69 extending to the ECU 64.

The branching passage 69 branches the air (the intake air) flowing through the inside of the intake duct, and supplies the air (the intake air) to the ECU 64. Thus, the ECU 64 is forcibly cooled by the supplied intake air.

Figure 4:
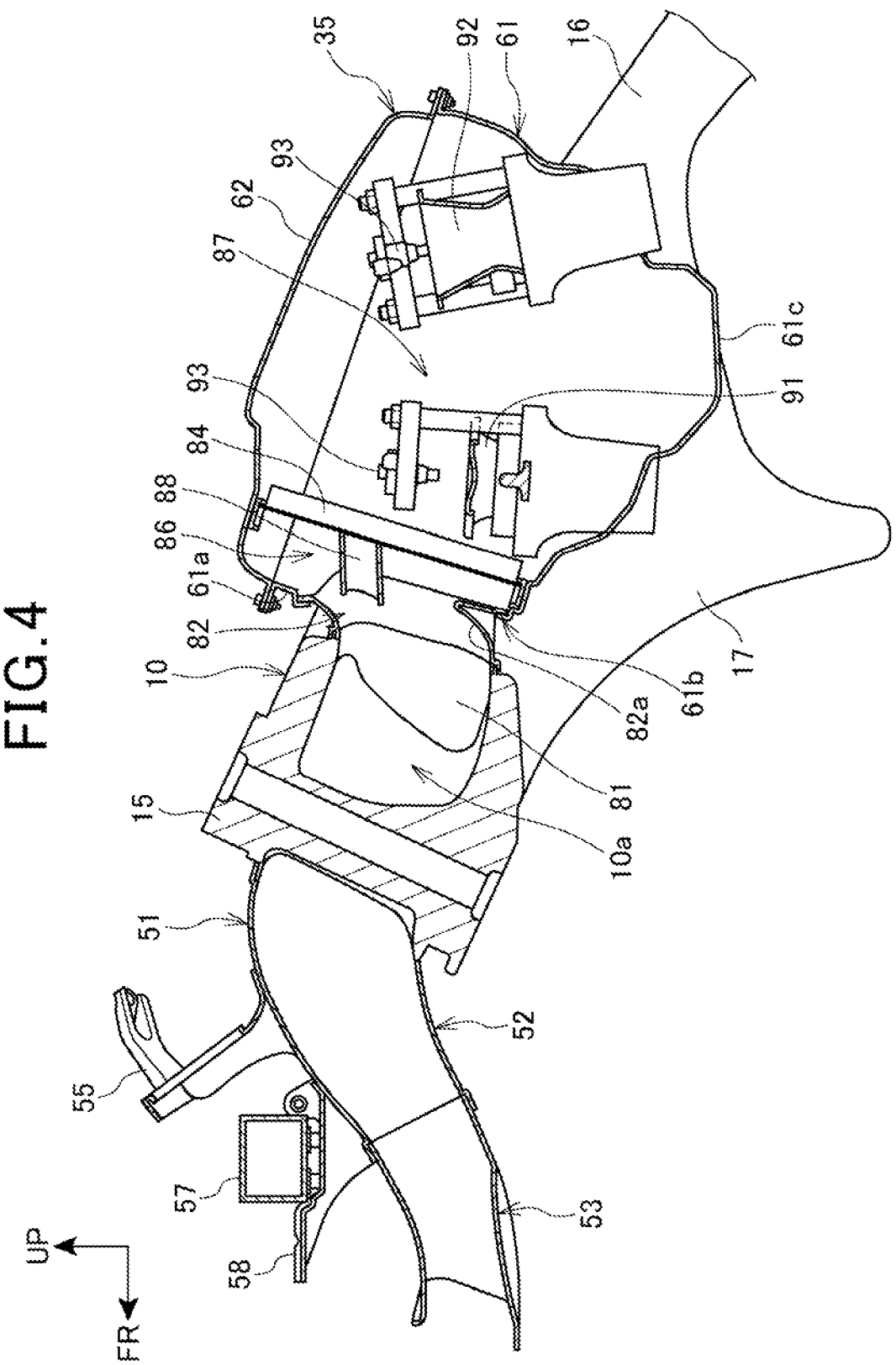
FIG. 4 is a cross-sectional view when the body frame, the air cleaner box, the intake duct, and the like are cut vertically on the vehicle body center line that extends in the vehicle longitudinal direction.

FIG. 4 is a cross-sectional view when the body frame 10, the air cleaner box 35, the intake duct 51, and the like are cut vertically on the vehicle body center line 78 (refer to FIG. 3) that extends in the vehicle longitudinal direction.

The body frame 10 includes an intake passage 10a that passes the left and right sides of the head pipe 15 and extends rearward of the head pipe 15.

To the front end portion of the intake passage 10a, the intake duct 51 (to be more specific, the rear duct 52) is connected. To the inner peripheral surface of the rear end portion of the intake passage 10a, an attachment 81 having a tubular shape is adhered. Also, to the rear edge of the attachment 81, the front edge of the joint 82 having a tubular shape is fittingly connected.

The joint 82 includes a guide portion 82a on the inner surface of the lower portion, the guide portion 82a guiding the intake air upward.

The rear edge of the joint 82 is connected to the edge of an opening 61b that is formed in a front wall 61a of the box body 61. The joint 82 configures an intake duct that connects the intake passage 10a and the air cleaner box 35 to each other.

The intake duct 51 and the joint 82 that is an intake duct configure a frame holding duct 85 that is disposed so as to sandwich the body frame 10.

The air cleaner box 35 includes a filter element 84 in the inner portion, the filter element 84 being disposed vertically so as to stretch between the box body 61 and the box cover 62, the front surface of the filter element 84 being directed vehicle forward.

The filter element 84 is a component that purifies the air (the intake air) introduced through the intake duct 51, the intake passage 10a, and the joint 82. By the filter element 84, the inside of the air cleaner box 35 is separated into a dirty side 86 on the intake passage 10a side and a clean side 87 on the rear side of the air cleaner box 35.

The filter element 84 includes an air guide port 88 that protrudes into the dirty side 86.

The air guide port 88 works to guide a part of the flow of the intake air inside the dirty side 86 toward the upper portion of the inside of the clean side 87.

Inside the clean side 87, a plural number of throttle bodies (not illustrated), a plural number of air funnels 91, 92 and injectors 93 are disposed, the air funnels 91, 92 being attached to the upper portions of the respective throttle bodies, the injectors 93 being respectively disposed so as to face the openings of the air funnels 91, 92. The respective injectors 93 inject fuel into the air funnels 91, 92 respectively, and supply the fuel to respective cylinders of the engine 11.

The throttle body described above penetrates a bottom wall 61c of the box body 61, and is connected to the cylinder portion 31 (refer to FIG. 1) of the engine 11 (refer to FIG. 1).

By arranging the air guide port 88 in the filter element 84 as described above, directivity is given to the air flowing into the clean side 87, and it is possible to make the air flow toward the upper portion of the inside of the clean side 87.

Figure 5:
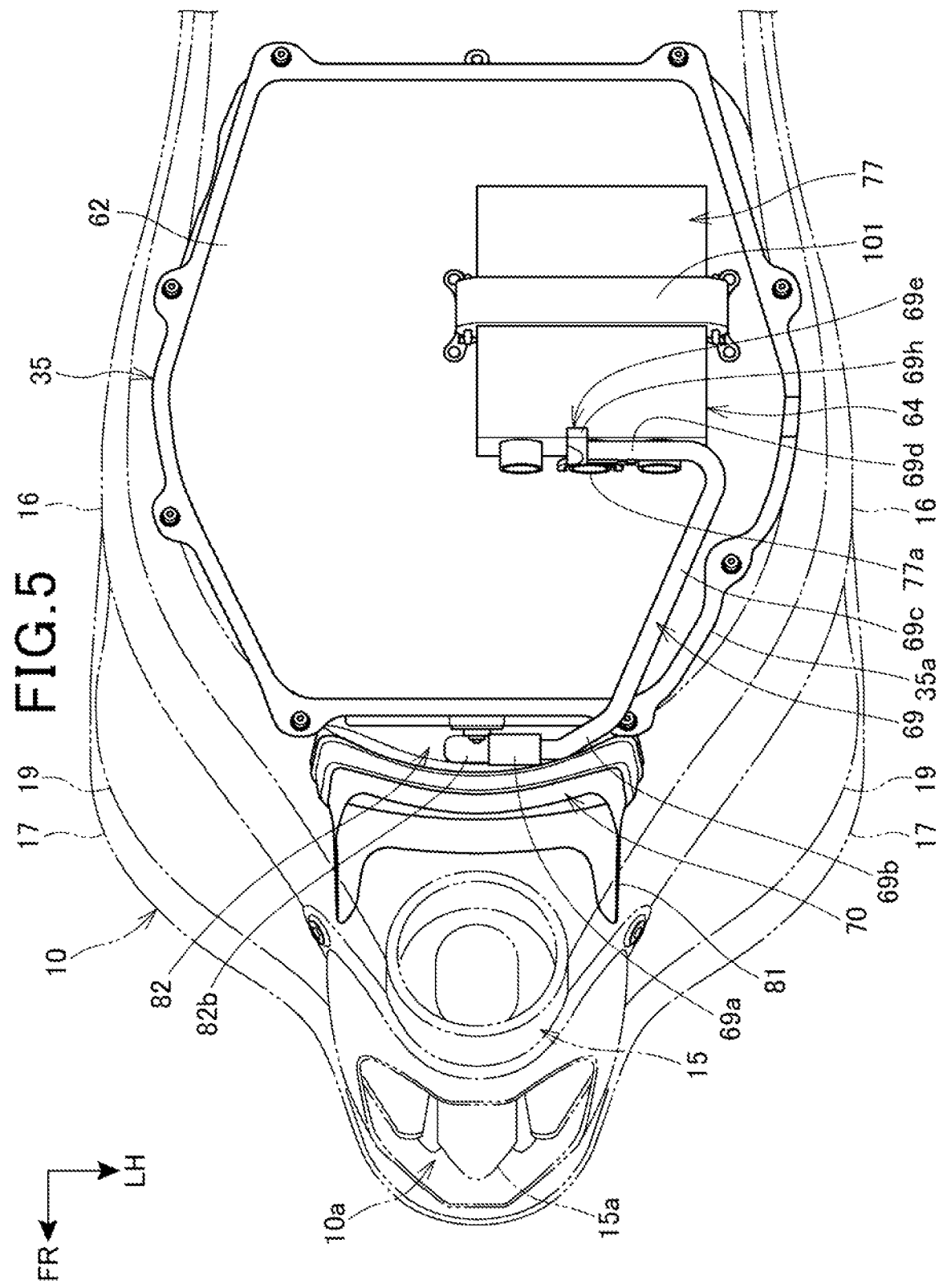
FIG. 5 is a plan view that shows a cooling structure of an ECU.
Figure 6:
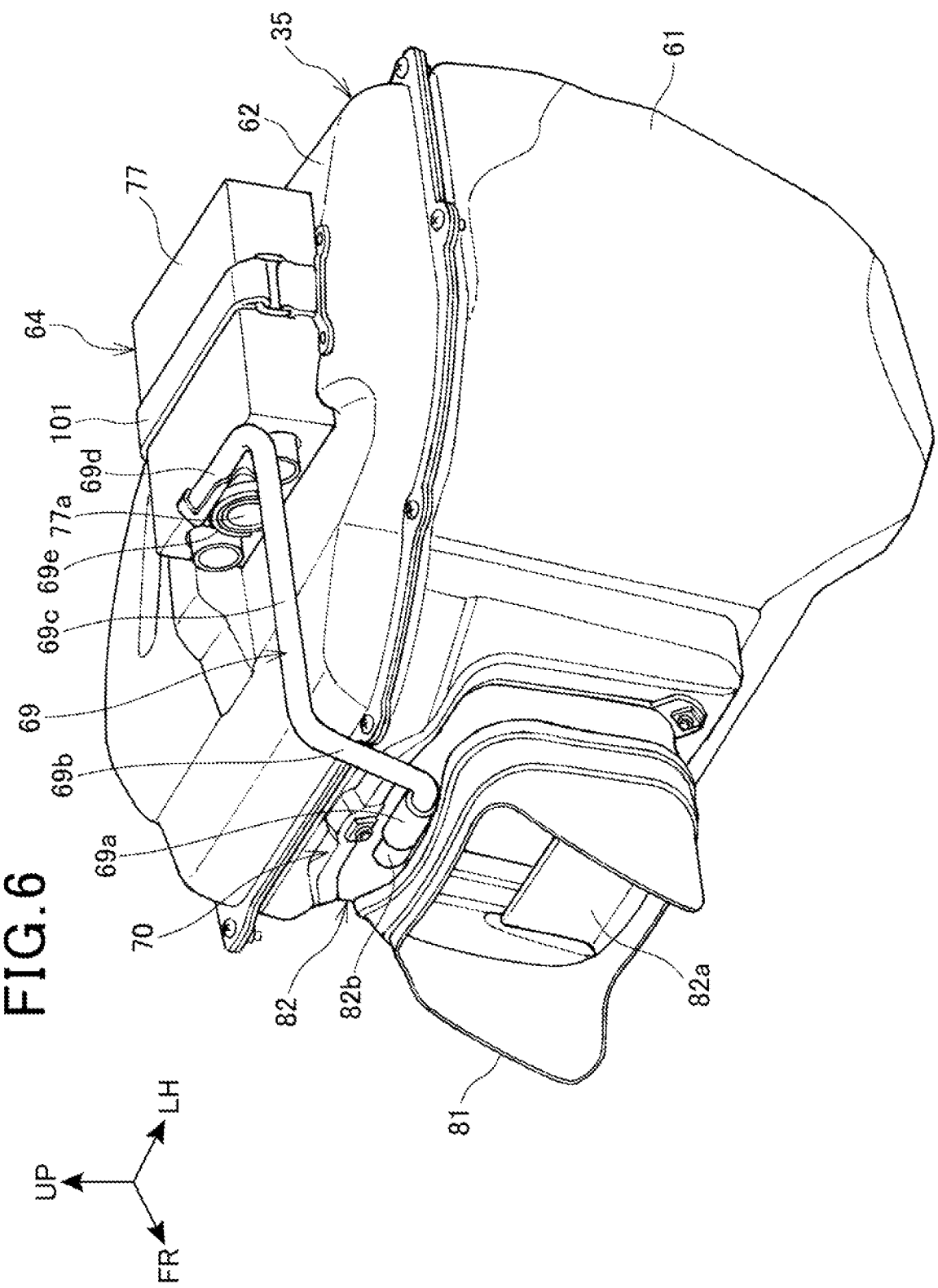
FIG. 6 is a perspective view that shows the cooling structure of the ECU.

FIG. 5 is a plan view that shows a cooling structure of the ECU 64, and FIG. 6 is a perspective view that shows the cooling structure of the ECU 64.

As shown in FIG. 5 and FIG. 6, the ECU 64 is fixed to the upper surface of the box cover 62 of the air cleaner box 35 by a fixing band 101 made of rubber.

In the upper portion of the joint 82 and the center portion in the vehicle width direction of the joint 82, a branching portion 82b is arranged, the branching portion 82b branching the intake air inside the joint 82 to outside the joint 82.

The branching portion 82b and the branching passage 69 configure an intake supply passage 70 that supplies the intake air to the ECU 64.

From the branching portion 82b, the branching passage 69 passes the front of and above the air cleaner box 35 and extends to the front of the ECU 64, and the distal end portion of the branching passage 69 is engaged with the front portion of the ECU 64.

When the pressure of the inside of the joint 82 that is the intake duct rises, the intake air inside the joint 82 passes through the branching passage 69 from the branching portion 82*b*, and is discharged from the rear end portion of the branching passage 69. The intake air having been discharged hits the ECU 64, and cools the ECU 64.

Since the space between the air cleaner box 35 and the fuel tank 37 (refer to FIG. 1) and the upper cover 44 (refer to FIG. 1) is narrow and the shape of the space is complicated, the travelling air hardly enters the space, and it is hard to sufficiently cool the ECU 64 by the travelling air. According to the present embodiment, by disposing the intake supply passage 70 in this space, during travelling of the vehicle, the intake air supply amount to the ECU 64 can be secured, and the ECU 64 can be cooled.

Figure 7:
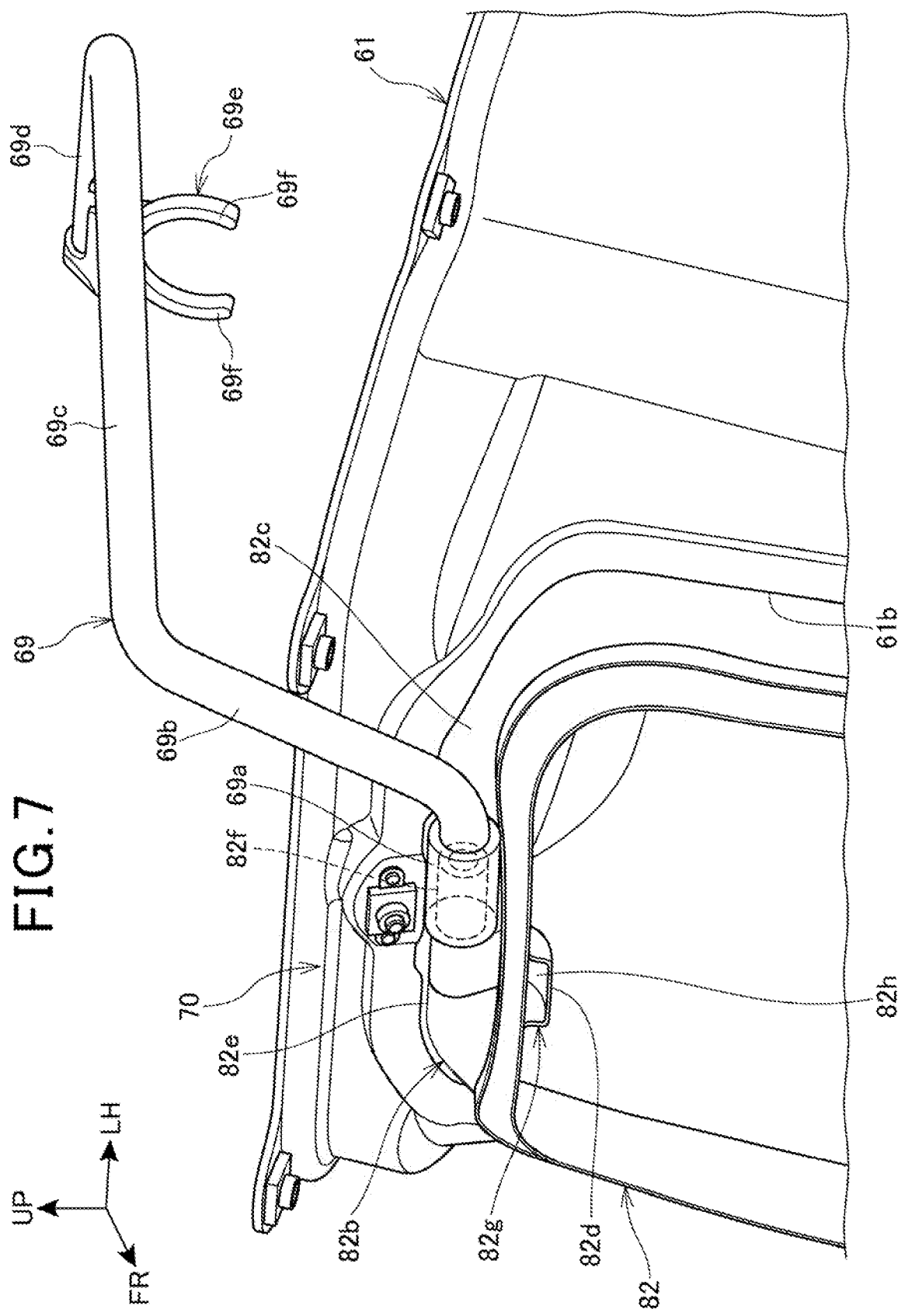
FIG. 7 is a perspective view that shows a structure of an intake supply passage.

FIG. 7 is a perspective view that shows a structure of the intake supply passage 70.

The branching portion 82*b* includes a downward protrusion portion 82*d*, an upward protrusion portion 82*e*, and a discharge port 82*f*, the downward protrusion portion 82*d* protruding downward from the inner surface of an upper wall 82*c* of the joint 82, the upward protrusion portion 82*e* protruding upward from the outer surface of the upper wall 82*c* of the joint 82, the discharge port 82*f* protruding to one side (the left side) in the vehicle width direction from the upward protrusion portion 82*e*.

The downward protrusion portion 82*d* includes an opening portion 82*g* in the front surface, the opening portion 82*g* taking in the intake air. The opening portion 82*g* is directed vehicle forward, namely to the upstream side of the intake passage inside the joint 82. Thus, it is facilitated to take in the intake air from the opening portion 82*g* into the branching portion 82*b*.

In the inside of the upward protrusion portion 82*e*, an inner passage 82*h* is formed, the inner passage 82*h* extending upward and sideways from the opening portion 82*g*. The discharge port 82*f* communicates with the inner passage 82*h*.

In FIG. 6 and FIG. 7, the branching passage 69 is a pipe made of a resin or made of metal, and includes a discharge port connection portion 69*a*, a vertical extension portion 69*b*, a front-rear extension portion 69*c*, a vehicle width direction extension portion 69*d*, and an engage portion 69*e*.

The discharge port connection portion 69*a* is a tubular portion fitted and connected to the discharge port 82*f* of the branching portion 82*b*. The vertical extension portion 69*b* is bent from the discharge port connection portion 69*a* and extends upward and obliquely sideways (upward and obliquely sideways to the left). The front-rear extension portion 69*c* is bent from the vertical extension portion 69*b* and extends to the ECU 64 side. The vehicle width direction extension portion 69*d* is bent from the front-rear extension portion 69*c*, and extends in the vehicle width direction. The engage portion 69*e* includes a portion having a C-shape arranged at the end portion of the vehicle width direction extension portion 69*d*, and is made to engage with a front-rear protrusion portion 77*a* that protrudes forward from the front portion of the ECU case 77 of the ECU 64. With respect to the engage portion 69*e*, a pair of arm portions 69*f* forming the C-shape clamp and support the front-rear protrusion portion 77*a* of the ECU case 77 in the vehicle width direction.

Thus, since the discharge port connection portion 69*a* of the front end portion of the branching passage 69 is fitted into the discharge port 82*f* from the vehicle width direction, the discharge port connection portion 69*a* hardly moves in the vehicle longitudinal direction. Also, since a pair of the arm portions 69*f* of the rear end portion of the branching passage 69 clamp and support the front-rear protrusion portion 77*a* in the vehicle width direction, the front-rear protrusion portion 77*a* extending in the vehicle longitudinal direction, the arm portions 69*f* hardly move in the vehicle width direction. Based on these facts, since the position of the branching passage 69 is restricted in both of the vehicle longitudinal direction and the vehicle width direction, the discharge port connection portion 69*a* and the engage portion 69*e* are suppressed from being loosened and dropping off by vibration of the vehicle body, and so on.

Figure 8:
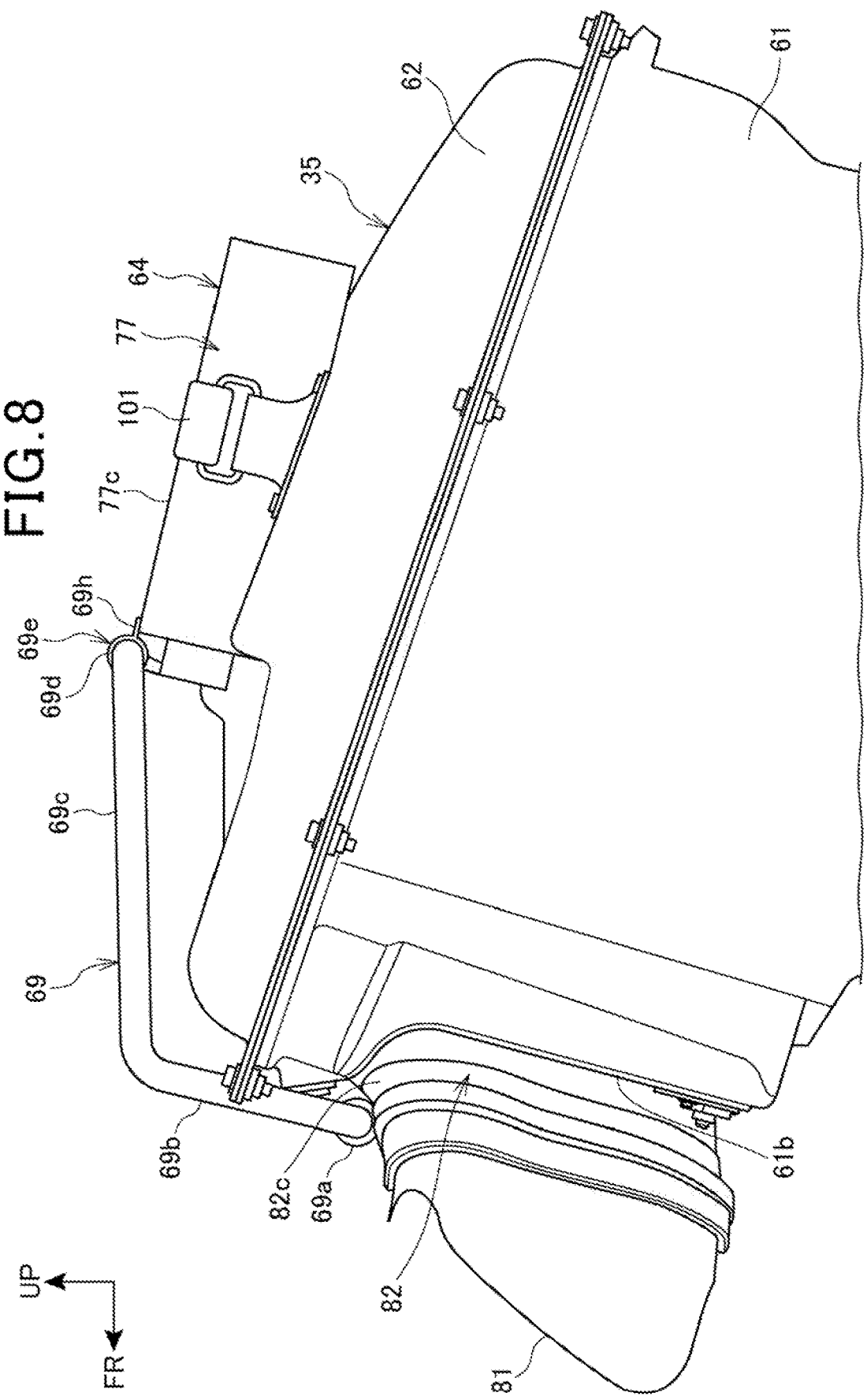
FIG. 8 is a left side view that shows the cooling structure of the ECU.
Figure 9:
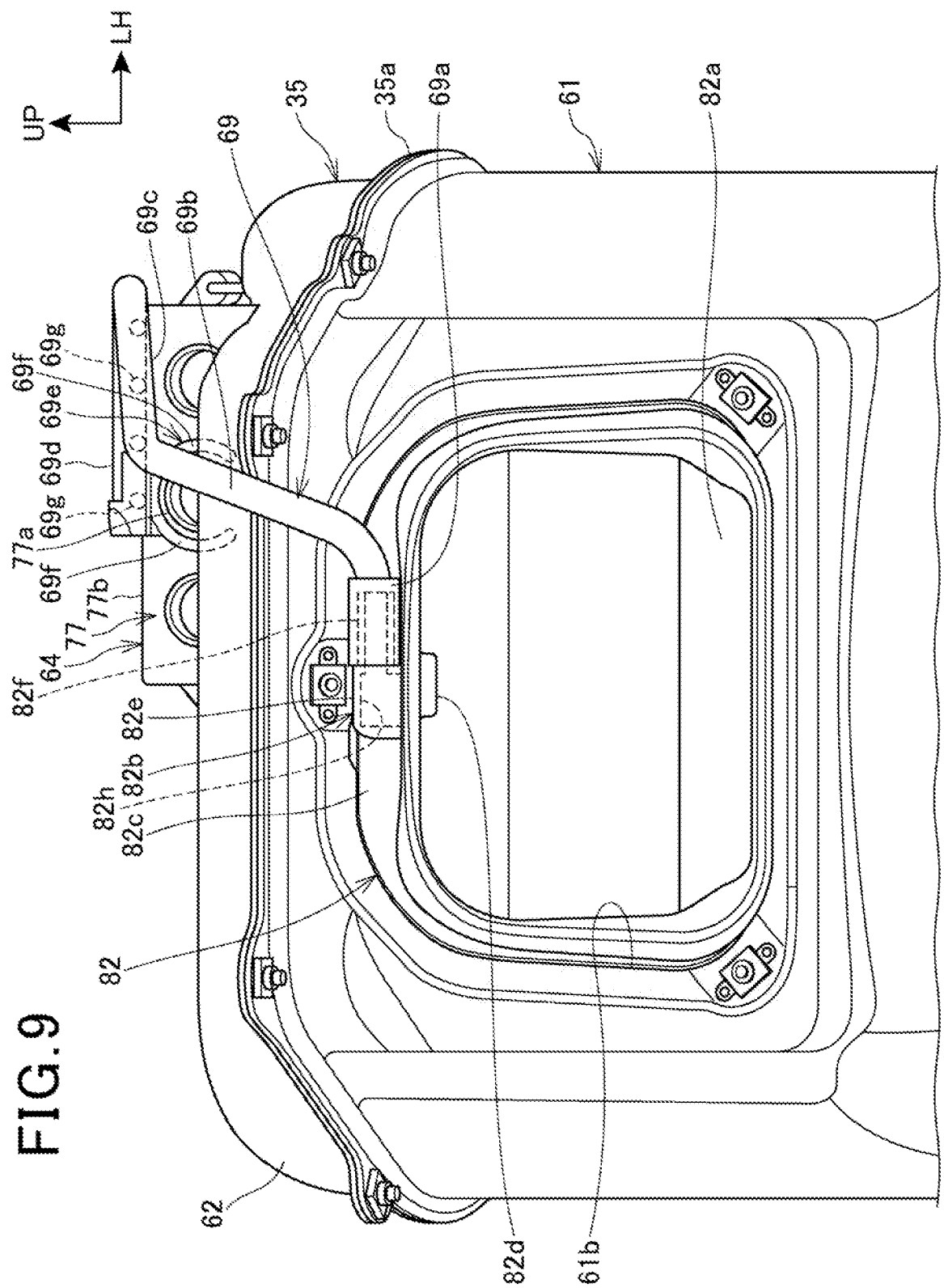
FIG. 9 is a front view that shows the cooling structure of the ECU.

FIG. 8 is a left side view that shows the cooling structure of the ECU 64, and FIG. 9 is a front view that shows the cooling structure of the ECU 64.

As shown in FIG. 8 and FIG. 9, the upper wall 82*c* of the joint 82 is formed downward to the front, and the upward protrusion portion 82*e* of the branching portion 82*b* is formed in the lower portion of the upper wall 82*c*. Thus, when the joint 82 is to be inserted to the opening 61*b* from the inner side of the box body 61, the upward protrusion portion 82*e* hardly becomes an obstacle, and the joint 82 can be inserted easily.

Since the discharge port 82*f* of the branching portion 82*b* extends in the vehicle width direction, the longitudinal direction of the branching portion 82*b* can be disposed along the upper wall 82*c* of the joint 82, and the forward discharge rate of the branching portion 82*b* can be suppressed. Thus, the gap between the body frame 10 (refer to FIG. 5) and the air cleaner box 35 can be narrowed, and the volume of the air cleaner box 35 can be expanded.

Also, since the discharge port 82*f* of the branching portion 82*b* extends in the vehicle width direction and the engage portion 69*e* has a structure of being engaged with the front-rear protrusion portion 77*a* of the ECU 64 from above, the branching passage 69 can be assembled as follows.

First, the discharge port connection portion 69*a* of the branching passage 69 is fitted into the discharge port 82*f* in a state where the engage portion 69*e* is disposed above the front-rear protrusion portion 77*a* of the ECU 64. Next, the left and right arm portions 69*f* of the engage portion 69*e* are made to engage with the front-rear protrusion portion 77*a* while the branching passage 69 is swung downward around the discharge port 82*f*. Thus, assembling of the branching passage 69 is completed. Also, even when the assembling order is reversed, assembling is possible without any problem. Thus, the branching passage 69 can be assembled easily.

The front-rear extension portion 69*c* and the vehicle width direction extension portion 69*d* of the branching passage 69 overlap with each other in the vehicle longitudinal direction in a vehicle front view, and the front-rear extension portion 69*c* and the vehicle width direction extension portion 69*d* overlap with the upper end of the ECU 64 (to be more specific, a corner portion 77*b* of the front portion of the ECU case 77).

At the rear portion of the vehicle width direction extension portion 69*d*, a plural number of air exhaust holes 69*g* discharging the intake air are opened. By arranging a plural numbers of the air exhaust holes 69*g* in the vehicle width direction extension portion 69*d* that extends in the vehicle width direction, the intake air can be made to hit over a wide area of the ECU 64 (for example, an upper surface 77*c* of the ECU case 77).

The engage portion 69*e* includes a rearward protrusion piece 69*h* that protrudes rearward. The rearward protrusion piece 69h is made to hit the upper portion of the ECU 64 (to be more specific, the upper surface 77c of the ECU case 77), thereby chattering in the vertical direction of the rear end portion of the branching passage 69 with respect to the ECU 64 can be suppressed in cooperation with a pair of the arm portions 69f, and the branching passage 69 can be fixed tightly.

The branching passage 69 extends sideways and obliquely upward (sideways to the left and obliquely upward) from the branching portion 82b in the vertical extension portion 69b in FIG. 9, and further extends vehicle rearward on the inner side in the vehicle width direction of a side edge 35a of the air cleaner box 35 along the side edge 35a in the front-rear extension portion 69c in a plan view in FIG. 5. Further, the branching passage 69 is bent, extends inward in the vehicle width direction and extends to the front of the ECU 64 in the vehicle width direction extension portion 69d.

By such shape of the branching passage 69, the bending angle of each portion of the branching passage 69 can be made smaller, the branching passage 69 can be made to follow the shape of the air cleaner box 35, and can be connected to the ECU 64 from a position close to an end of the air cleaner box 35. Thus, the protrusion amount of the branching passage 69 from the air cleaner box 35 can be suppressed and the branching passage 69 does not interfere opening/closing of the box cover 62, and therefore maintainability of replacement of the filter element 84 (refer to FIG. 4) and so on can be improved.

As shown in FIG. 1, FIG. 4, and FIG. 6 above, with respect to the motorcycle 1 as a saddle riding vehicle, the air cleaner box 35 is disposed in the front portion of the vehicle body and above the engine 11, and the ECU 64 as an electric component is disposed on and supported by the upper surface of the air cleaner box 35.

The ECU 64 is covered by the fuel tank 37 and the upper cover 44 as the vehicle body trim parts along with the upper surface of the air cleaner box 35.

The frame holding duct 85 as an intake duct is connected to the air cleaner box 35. The frame holding duct 85 extends vehicle forward from the air cleaner box 35, is connected to the body frame 10, and is arranged inside the upper cowl 41 that covers the front portion of the body frame 10, and the branching portion 82b for the intake air is arranged in the frame holding duct 85. The branching passage 69 extending from the branching portion 82b is disposed between the upper surface of the air cleaner box 35 and the fuel tank 37 and the upper cover 44, and is positioned in front of the ECU 64.

With this configuration, by arranging the branching portion 82b in the frame holding duct 85 and extending the branching passage 69 from the branching portion 82b to the ECU 64 side, it is facilitated to secure an air passage in the enclosed space between the air cleaner box 35 and the fuel tank 37 and the upper cover 44, the air passage being for effectively taking in the intake air, and the ECU 64 can be cooled intensively and positively utilizing the intake air.

Also, as shown in FIG. 3, the frame holding duct 85 includes the intake duct 51 as the first intake duct and the joint 82 as the second intake duct, the intake duct 51 being connected to the front end portion of the body frame 10, the joint 82 connecting the body frame 10 and the air cleaner box 35 to each other. The branching portion 82b is arranged in the joint 82.

With this configuration, it is constructed that the travelling air is sucked through the body frame 10 and is positively taken in by the intake duct 51 connected to the front end portion of the body frame 10. Also, the branching passage 69 is arranged in the joint 82 that is connected to the air cleaner box 35, thereby the intake air can be branched from a position close to the ECU 64, and the intake air can be guided effectively to the ECU 64.

Also, as shown in FIG. 7, the branching portion 82b is formed at the upper portion of the joint 82, the opening portion 82g is formed in the inner surface of the joint 82, the branching portion 82b being provided with the opening portion 82g, and the opening portion 82g is directed vehicle forward.

With this configuration, the intake air flowing toward the air cleaner box 35 inside the joint 82 can be positively branched.

Also, as shown in FIG. 5 and FIG. 9, the branching passage 69 includes the vehicle width direction extension portion 69d directed to the vehicle width direction along the front portion of the ECU 64, and includes a plural number of the air exhaust holes 69g in the vehicle width direction extension portion 69d. Accordingly, the ECU 64 can be cooled efficiently with a simple shape.

Also, as shown in FIG. 6 and FIG. 9, the engage portion 69e engaging with the ECU 64 is provided at the end portion of the branching passage 69. Accordingly, the branching passage 69 can be supported by the ECU 64, and the supporting rigidity in supporting the branching passage 69 can be enhanced with a simple structure.

Also, the branching passage 69 includes the discharge port connection portion 69a, the discharge port connection portion 69a being fitted into the discharge port 82f that is formed in the branching portion 82b so as to extend in the vehicle width direction, and the engage portion 69e clamps and supports the front-rear protrusion portion 77a in the vehicle width direction, the front-rear protrusion portion 77a being arranged in the ECU 64 so as to protrude in the vehicle longitudinal direction.

With this configuration, movement of the branching passage 69 in the vehicle longitudinal direction and the vehicle width direction can be restricted.

Also, as shown in FIG. 5 and FIG. 9, the branching passage 69 extends obliquely upward to a side from the branching portion 82b, the branching portion 82b being arranged at the center portion in the vehicle width direction, further extends vehicle rearward on the inner side in the vehicle width direction of the side edge 35a of the air cleaner box 35 along the side edge 35a in a plan view, and further curvingly extends inward in the vehicle width direction and reaches the front of the ECU 64.

With this configuration, the bending angle of each portion of the branching passage 69 can be made smaller, and the branching passage 69 can be made to follow the shape of the air cleaner box 35 and can be connected to the ECU 64 from a position close to an end of the air cleaner box 35. Thus, the protrusion amount of the branching passage 69 from the air cleaner box 35 is suppressed, and the branching passage 69 can improve the maintainability of replacement of the filter element 84 (refer to FIG. 4) and so on.

The embodiment described above only shows an aspect of the present invention, and alteration and application are optionally possible within a range not departing from the gist of the present invention.

For example, although the intake supply passage 70 is arranged in the joint 82 as shown in FIG. 5 in the embodiment described above, the present invention is not limited to it, and it is also possible to arrange the intake supply passage 70 in the intake duct 51 shown in FIG. 3 and the intake passage 10a shown in FIG. 4 and to cool the ECU 64.

The present invention is not limited to a case of being applied to the motorcycle 1, and can be applied also to saddle riding vehicles including those other than the motorcycle 1. Also, the saddle riding vehicle includes all vehicles where an occupant rides saddling the vehicle body, and is a vehicle not only a motorcycle (inclusive of a bicycle with an engine) but also a three wheeled vehicle and a four wheeled vehicle classified to an ATV (All Terrain Vehicle).

REFERENCE SIGNS LIST

1 . . . Motorcycle (saddle riding vehicle)
10 . . . Body frame
10a . . . Intake passage
11 . . . Engine
35 . . . Air cleaner box
35a . . . Side edge
37 . . . Fuel tank (vehicle body trim part)
41 . . . Upper cowl
44 . . . Upper cover (vehicle body trim part)
51 . . . Intake duct (first intake duct)
64 . . . ECU (electric component)
69 . . . Branching passage
69a . . . Discharge port connection portion
69d . . . Vehicle width direction extension portion
69e . . . Engage portion
69g . . . Air exhaust hole
77a . . . Front-rear protrusion portion
82 . . . Joint (second intake duct)
82b . . . Branching portion
82f . . . Discharge port
82g . . . Opening portion
85 . . . Frame holding duct (intake duct)

The invention claimed is:

1. A saddle riding vehicle, in which an air cleaner box is disposed above an engine at a front portion of a vehicle body, an electric component is disposed on and is supported by an upper surface of the air cleaner box, the electric component being covered by vehicle body trim parts along with the upper surface of the air cleaner box,
wherein an intake duct is connected to the air cleaner box,
the intake duct extends vehicle forward from the air cleaner box, is connected to a body frame, and is arranged inside an upper cowl covering a front portion of the body frame,
a branching portion of intake air is arranged in the intake duct, and
a branching passage extending from the branching portion is disposed between the upper surface of the air cleaner box and the vehicle body trim parts and is positioned in front of the electric component,
the branching passage is a pipe that extends from the branching portion to the electric component and includes a vehicle width direction extension portion directed in a vehicle width direction along a front portion of the electric component,
the vehicle width direction extension portion overlaps with an upper end of a case of the electric component in a vehicle front view, and
at a rear portion of the vehicle width direction extension portion, a plurality of air exhaust holes are opened in an orientation such that intake air discharged through the plurality of air exhaust holes hits an upper surface of the case.

2. The saddle riding vehicle according to claim 1, wherein the intake duct includes a first intake duct and a second intake duct, the first intake duct being connected to the front end portion of the body frame, the second intake duct connecting the body frame and the air cleaner box to each other, and the branching portion is arranged in the second intake duct.

3. The saddle riding vehicle according to claim 2, wherein the branching portion is formed at an upper portion of the second intake duct,
an opening portion is formed in the inner surface of the second intake duct, the branching portion being provided with the opening portion, and the opening portion is directed vehicle forward.

4. The saddle riding vehicle according to claim 1, wherein the pipe includes an engage portion engaging with the electric component, the engage portion being provided at an end portion of the branching passage.

5. The saddle riding vehicle according to claim 4, wherein the branching passage includes a discharge port connection portion fitted into a discharge port that is formed in the branching portion so as to extend in the vehicle width direction, and
the engage portion clamps and supports a front-rear protrusion portion in the vehicle width direction, the front-rear protrusion portion being arranged in the electric component so as to protrude in the vehicle longitudinal direction.

6. The saddle riding vehicle according to claim 1, wherein the branching passage extends obliquely upward to a side from the branching portion arranged at the center portion in the vehicle width direction,
the branching passage further extends vehicle rearward on the inner side in the vehicle width direction of a side edge of the air cleaner box along the side edge in a plan view, and
the branching passage further curvingly extends inward in the vehicle width direction and reaches the front of the electric component.

* * * * *